United States Patent
Yamaguchi et al.

(10) Patent No.: US 9,955,172 B2
(45) Date of Patent: Apr. 24, 2018

(54) VIDEO DATA PROCESSING DEVICE AND METHOD

(71) Applicant: FUJITSU LIMITED, Kawasaki-shi, Kanagawa (JP)

(72) Inventors: Yousuke Yamaguchi, Fukuoka (JP); Shunsuke Kobayashi, Fukuoka (JP); Kazuhiro Yamashita, Fukuoka (JP); Yasuo Misuda, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 170 days.

(21) Appl. No.: 14/920,387

(22) Filed: Oct. 22, 2015

(65) Prior Publication Data
US 2016/0134875 A1 May 12, 2016

(30) Foreign Application Priority Data
Nov. 12, 2014 (JP) ................ 2014-230182

(51) Int. Cl.
| | |
|---|---|
| *H04N 19/00* | (2014.01) |
| *H04N 19/172* | (2014.01) |
| *H04N 19/107* | (2014.01) |
| *H04N 19/137* | (2014.01) |
| *H04N 19/152* | (2014.01) |

(52) U.S. Cl.
CPC ......... *H04N 19/172* (2014.11); *H04N 19/107* (2014.11); *H04N 19/137* (2014.11); *H04N 19/152* (2014.11)

(58) Field of Classification Search
CPC .. H04N 19/172; H04N 19/107; H04N 19/137; H04N 19/152
USPC ..................................................... 375/240.01
See application file for complete search history.

(56) References Cited

U.S. PATENT DOCUMENTS

| | | | | |
|---|---|---|---|---|
| 6,167,155 A | * | 12/2000 | Kostrzewski | ........... G06T 9/001 348/699 |
| 2005/0031030 A1 | | 2/2005 | Kadono et al. | |
| 2008/0152012 A1 | | 6/2008 | Ohgose et al. | |
| 2009/0296809 A1 | | 12/2009 | Yamori et al. | |

FOREIGN PATENT DOCUMENTS

| | | |
|---|---|---|
| JP | 2008-154187 | 7/2008 |
| JP | 2009-81898 | 4/2009 |
| JP | 2009-290463 | 12/2009 |
| JP | 2013-243480 | 12/2013 |

* cited by examiner

*Primary Examiner* — Jeffery Williams
(74) *Attorney, Agent, or Firm* — Staas & Halsey LLP

(57) ABSTRACT

A video data processing device includes: a processor; and a memory which stores a plurality of instructions, which when executed by the processor, cause the processor to execute: making, on the basis of first key frames obtained by encoding images in frames included in moving image data, difference frames in each of which a partial image different from an image in a frame corresponding to each first key frame is encoded; and generating, if the number of generated difference frames reaches a first number, in response to detection that a difference between a difference frame generated thereafter and a difference frame preceding in time to the difference frame generated thereafter is not larger than a given value, a second key frame distinguished from the first key frames and obtained by encoding an image in the frame.

10 Claims, 7 Drawing Sheets

VIDEO DATA PROCESSING DEVICE AND METHOD

CROSS-REFERENCE TO RELATED APPLICATION

This application is based upon and claims the benefit of priority of the prior Japanese Patent Application No. 2014-230182, filed on Nov. 12, 2014, the entire contents of which are incorporated herein by reference.

FIELD

The embodiments disclosed herein relate, for example, to a video data processing device and so forth.

BACKGROUND

In a real time video transmission system of a prior art, it is prescribed in a standard that, when a video is to be transmitted, an instantaneous decoding refresh (IDR) picture is inserted and then a predictive picture (P picture) and so forth are inserted. In recent years, it is sometimes tried to reduce a delay by decreasing an encoding buffer amount in accordance with an information amount of the P picture whose information amount is smaller than that of the IDR picture.

Here, a timing at which an IDR picture is inserted is a timing at which the picture order count (POC) value indicates a maximum value. The POC value is a value that counts up every time a video is encoded to generate a P picture. If an IDR picture is inserted, then the POC value is reset to an initial value. According to a prior art, an IDR picture is inserted before the POC value overflows.

FIG. 7 is a view illustrating a timing at which an IDR picture is inserted according to a prior art. As an example, it is assumed that P pictures 10 to 17 are successively inserted and the POC value at a timing at which the P picture 17 is inserted is 999 and then the POC value changes to 1000, which is a maximum value of the POC value, at a timing at which a picture 18 is generated. In this case, an IDR picture 18 is inserted next to the P picture 17, whereupon the POC value is reset. Though not depicted in FIG. 7, P pictures are successively inserted after the IDR picture 18, and the process described above is executed repetitively. It is to be noted that the maximum value of the POC value may be changed suitably. While it is indicated that the maximum value of the POC value is 1000 as an example in FIG. 7, the maximum value is not limited to this.

As related art documents, for example, Japanese Laid-Open Patent Publications Nos. 2013-243480, 2009-81898, 2008-154187 and 2009-290463, and US Patent Application Publications Nos. 2005/0031030, 2008/0152012 and 2009/0296809 are available.

SUMMARY

According to an aspect of the embodiment, a video data processing device includes: a processor; and a memory which stores a plurality of instructions, which when executed by the processor, cause the processor to execute: making, on the basis of first key frames obtained by encoding images in frames included in moving image data, difference frames in each of which a partial image different from an image in a frame corresponding to each first key frame is encoded; and generating, if the number of generated difference frames reaches a first number, in response to detection that a difference between a difference frame generated thereafter and a difference frame preceding in time to the difference frame generated thereafter is not larger than a given value, a second key frame distinguished from the first key frames and obtained by encoding an image in the frame.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

In the following, embodiments of a video data processing device, a video data processing program and a video data processing method disclosed herein are described with reference to the drawings. It is to be noted that the technology disclosed herein is not limited to the embodiments.

Embodiment 1

Figure 1:
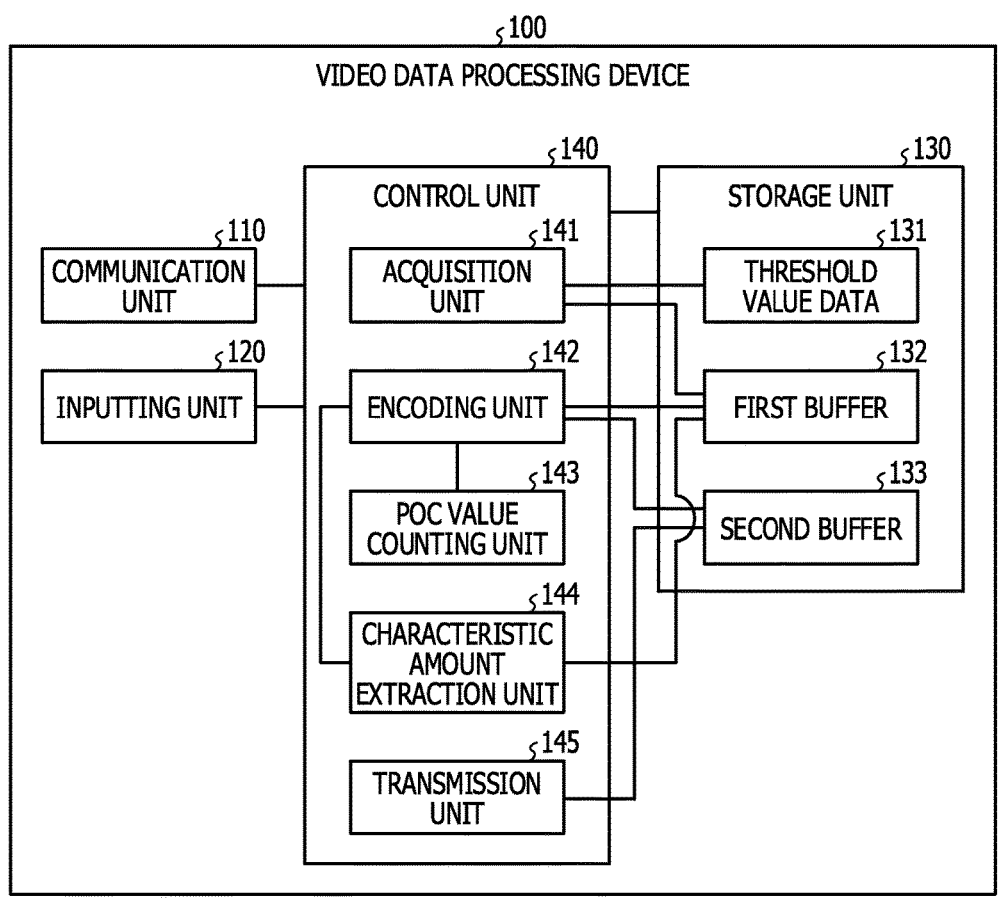
FIG. 1 is a functional block diagram depicting a configuration of a video data processing device according to an embodiment 1.

An example of a configuration of a video data processing device according to an embodiment 1 is described. FIG. 1 is a functional block diagram depicting a configuration of a video data processing device according to an embodiment 1. As depicted in FIG. 1, the video data processing device 100 includes a communication unit 110, an inputting unit 120, a storage unit 130 and a control unit 140.

The communication unit 110 is a device that transmits and receives data to and from an external device not depicted through a network. The communication unit 110 corresponds to a communication device or the like. The communication unit 110 acquires encoded stream information from the control unit 140 hereinafter described and transmits the acquired encoded stream information to an external device of a transmission destination.

The inputting unit 120 is an input interface for inputting various kinds of information to the video data processing device 100. For example, a video rate, threshold value data, original image data and so forth are inputted from the inputting unit 120 to the video data processing device 100.

The storage unit 130 includes threshold value data 131, a first buffer 132 and a second buffer 133. The storage unit 130 corresponds to a storage device such as, for example, a random access memory (RAM), a read only memory (ROM), a flash memory or the like.

The threshold value data 131 is threshold value data that is used when an encoding unit 142 hereinafter described carries out various decisions. For example, the threshold value data 131 includes a first threshold value, a second threshold value, a third threshold value and a fourth threshold value. The first, second, third and fourth thresh values are hereinafter described.

The first buffer 132 is a buffer for accumulating original image data inputted from the inputting unit 120. The second buffer 133 is a buffer for storing coded stream information generated by the control unit 140. While the first buffer 132 and the second buffer 133 are depicted separately from each other as an example in FIG. 1, the first buffer 132 and the second buffer 133 may be integrated each other.

The control unit 140 includes an acquisition unit 141, the encoding unit 142, a POC value counting unit 143, a characteristic amount extraction unit 144, and a transmission unit 145. The control unit 140 corresponds to an integrated device such as, for example, an application specific integrated circuit (ASIC) or a field programmable gate array (FPGA). Further, the control unit 140 corresponds to an electronic circuit such as, for example, a central processing unit (CPU) or a micro processing unit (MPU).

The acquisition unit 141 is a processor that acquires various kinds of information from the inputting unit 120 and stores the acquired information into the storage unit 130. For example, if threshold value data 131 is acquired, then the acquisition unit 141 stores the threshold value data 131 into the storage unit 130. If original image data are acquired, then the acquisition unit 141 accumulates the acquired original image data into the first buffer 132.

The encoding unit 142 is a processor that encodes the original image data accumulated in the first buffer 132 to generate encoded stream information and accumulates the generated encoded stream information into the second buffer 133. For example, the encoding unit 142 first generates, as encoded stream information, an intra-coded picture (I picture) and then generates predictive pictures (P pictures) successively. Then, at a timing at which a given condition is satisfied, the encoding unit 142 generates an IDR picture and inserts the generated IDR picture into the encoded stream information. The timing at which the encoding unit 142 inserts an IDR picture is hereinafter described. After an IDR picture is inserted, the encoding unit 142 successively generates P pictures and executes the process described hereinabove repetitively.

The encoding unit 142 uses an image encoding compression method in compliance with an image encoding method of H.264/moving picture experts group phase 4 (MPEG4) advanced video coding (AVC) or H.265/high efficiency video coding (HEVC). In particular, the encoding unit 142 encodes original image data of the first buffer 132 in accordance with an image encoding method of H.264/MPEG4 or H.265/HEVC to generate I pictures, P pictures and IDR pictures.

For example, an I picture is information obtained by encoding a full image in a frame of original image data. A P picture is information obtained by encoding a partial image different from an image in a frame corresponding to an I frame or an IDR frame. An IDR picture is information obtained by encoding a full image in a frame of original image data similarly to an I picture but is distinguished from an I picture.

The POC value counting unit 143 is a processor that counts the POC value and notifies the encoding unit 142 of the counted POC value. For example, the POC value counting unit 143 increments the POC value every time the POC value counting unit 143 generates a P picture. The initial value of the POC value is 0. Further, when the encoding unit 142 generates an IDR picture, the POC value counting unit 143 resets the POC value to the initial value.

The characteristic amount extraction unit 144 is a processor that compares original image data stored in the first buffer 132 and original image data of a frame preceding by one frame to the frame of the original image data with each other to extract a characteristic amount and notifies the encoding unit 142 of information of the extracted characteristic amount. In the following, pieces of original image data determined as a target of comparison are referred to as first original image data and second original image data. For example, the first original image data is original image data that is an encoding target of the encoding unit 142, and the second original image data is original image data preceding by one frame to the first original image data.

The characteristic amount extraction unit 144 calculates a degree of coincidence between the first original image data and the second original image data as a characteristic amount. The degree of coincidence is a value indicative of by what degree the first original image data and the second original image data coincide with each other. The characteristic amount extraction unit 144 calculates a degree of coincidence, for example, in accordance with an expression (1) given below. In the expression (1), m is a quantity of pixels in a horizontal direction of original image data; n a quantity of pixels in a vertical direction of the original image data; $a(i,j)$ a pixel value of coordinates $(i,j)$ of the first original image data; and $b(i,j)$ is a pixel value of the coordinates $(i,j)$ of the second original image data.

$$\text{Degree of coincidence}=1/(m\times n)\times \Sigma |a(i,j)-b(i,j)|^2 \qquad (1)$$

Incidentally, the characteristic amount extraction unit 144 may calculate the degree of coincidence alternatively using an expression (2) or an expression (3).

$$\text{Degree of coincidence}=1/(1/(m\times n)\times \Sigma |a(i,j)-b(i,j)|^2) \qquad (2)$$

$$\text{Degree of coincidence}=1/(\Sigma |a(i,j)-b(i,j)|) \qquad (3)$$

The transmission unit 145 is a processor that extracts encoded stream information accumulated in the second buffer 133 and outputs the extracted encoded stream information to the communication unit 110.

Now, a process performed by the encoding unit 142 to decide a timing at which an IDR picture is to be inserted is described. For example, when the POC value is higher than a first threshold value, the encoding unit 142 advances its processing to the process for deciding a timing at which an IDR picture is to be inserted.

After the process for deciding a timing at which an IDR picture is to be inserted is entered, if the POC value is higher than a second threshold value, then the encoding unit 142 decides that the time at present is a timing at which an IDR picture is to be inserted. The second threshold value is a threshold value higher than the first threshold value and corresponds, for example, a maximum value that may be assumed by the POC value. The first and second threshold values may be set suitably by a manager.

If the POC value is equal to or lower than the second threshold value, then the encoding unit 142 decides on the basis of a degree of coincidence whether or not the first original image data and the second original image data coincide with each other by a degree equal to or higher than a certain reference. For example, when the degree of coincidence is equal to or higher than a third threshold value, the encoding unit 142 decides that the first original image data and the second original image data coincide with each other by a degree equal to or higher than the certain reference.

If it is decided that the first original image data and the second original image data coincide with each other by a degree equal to or higher than the certain reference, then the encoding unit 142 further specifies an encoding buffer occupancy. For example, the encoding buffer is a buffer for storing first original image data when the encoding unit 142 carries out encoding. The encoding buffer occupancy is a value obtained on the basis of an information amount of first original image data of an encoding target occupied by a related encoding buffer. When the encoding buffer occupancy is equal to or higher than a fourth threshold value, the encoding unit 142 decides that the present point of time is a timing at which an IDR picture is to be inserted. The encoding unit 142 generates an IDR picture on the basis of the first original image data and inserts the IDR picture into encoded stream information.

Figure 2:
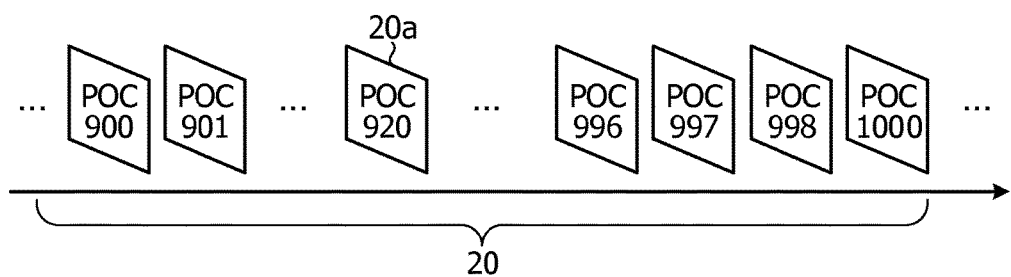
FIG. 2 is a view illustrating a timing at which an IDR picture is inserted.

FIG. 2 is a view illustrating a timing at which an IDR picture is inserted. In encoded stream information 20 of FIG. 2, a plurality of encoded pictures are inserted. For example, if the degree of coincidence is equal to or higher than the third threshold value and besides the buffer occupancy is equal to or higher than the fourth threshold value at a point of time at which an IDR picture 20*a* is to generated, even if the POC value does not reach the fourth threshold value, the encoding unit 142 inserts the picture 20*a* as an IDR picture 20*a*.

Here, where the first original image data and the second original image data coincide with each other by a degree equal to or higher than the certain reference, since this signifies that pieces of similar image data successively appear, even if an IDR picture having a comparatively small information amount is inserted, this provides less discomfort and the degree of influence of image degradation is low. Further, where the encoding buffer occupancy is high, an IDR picture generated includes a great information amount that may be utilized, and therefore, image degradation may be suppressed to the minimum.

Figure 3:
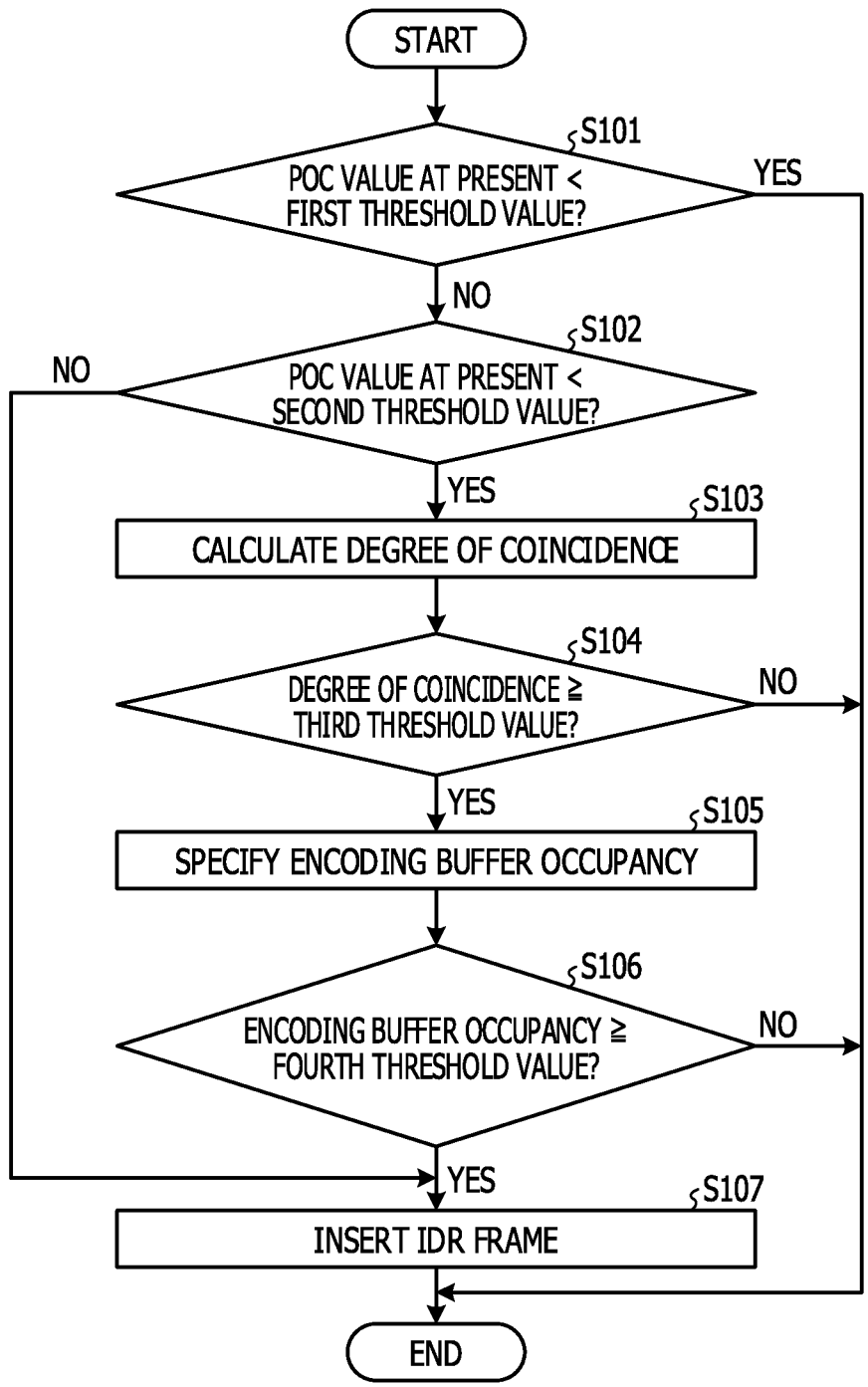
FIG. 3 is a flow chart illustrating a processing procedure of a video data processing device according to the embodiment 1.

Now, a processing procedure of the video data processing device 100 according to the embodiment 1 is described. FIG. 3 is a flow chart illustrating a processing procedure of a video data processing device according to an embodiment 1. For example, the video data processing device 100 executes the process illustrated in FIG. 3 every time original image data is encoded.

As depicted in FIG. 3, the encoding unit 142 of the video data processing device 100 decides whether or not the POC value at present is lower than the first threshold value (step S101). If the encoding unit 142 decides that the POC value at present is lower than the first threshold value (step S101: Yes), then the encoding unit 142 ends the processing.

On the other hand, if the encoding unit 142 decides that the POC value at present is equal to or higher than the first threshold value (step S101: No), then the encoding unit 142 decides whether or not the POC value at present is lower than the second threshold value (step S102). If the encoding unit 142 decides that the POC value at present is equal to or higher than the second threshold value (step S102: No), then the encoding unit 142 advances the processing to step S107.

On the other hand, If the encoding unit 142 decides that the POC value at present is lower than the second threshold value (step S102: Yes), then the characteristic amount extraction unit 144 of the video data processing device 100 calculates the degree of coincidence (step S103). Then, the encoding unit 142 decides whether or not the degree of coincidence is equal to or higher than the third threshold value (step S104).

If the encoding unit 142 decides that the degree of coincidence is not equal to or higher than the third threshold value (step S104: No), then the encoding unit 142 ends the processing. On the other hand, if the encoding unit 142 decides that the degree of coincidence is equal to or higher than the third threshold value (step S104: Yes), then the encoding unit 142 specifies an encoding buffer occupancy (step S105). Then, the encoding unit 142 decides whether or not the encoding buffer occupancy is equal to or higher than the fourth threshold value (step S106).

If the encoding unit 142 decides that the encoding buffer occupancy is not equal to or higher than the fourth threshold value (step S106: No), then the encoding unit 142 ends the processing. However, if the encoding unit 142 decides that the encoding buffer occupancy is equal to or higher than the fourth threshold value (step S106: Yes), then the encoding unit 142 inserts an IDR frame (step S107).

Now, an effect of the video data processing device 100 according to the embodiment 1 is described. If the POC value reaches the first threshold value, then the video data processing device 100 performs comparison of successive pieces of original image data and decides, on the basis of a degree of coincidence, whether or not the difference between the preceding and succeeding frames is equal to or smaller than a given magnitude. Then, at a timing at which it is detected that the difference between the preceding and succeeding frames is equal to or smaller than the given magnitude, the video data processing device 100 generates and inserts an IDR picture into the encoded stream information. Consequently, image deterioration when an IDR picture is inserted may be suppressed. For example, when the difference between the first original image data and the second original image data is equal to or smaller than the given magnitude, since this signifies that pieces of similar image data successively appear, and therefore, even if an IDR picture is inserted, this provides less discomfort and the degree of influence of image degradation is low.

Further, when the POC value does not exceed the first threshold value, the video data processing device 100 does not generate an IDR picture, but when the POC value exceeds the second threshold value that is higher than the first threshold value, the video data processing device 100 generates an IDR picture. Therefore, many IDR pictures are not inserted in a short period of time and the POC value does not suffer from overflowing.

Further, every time a P picture is generated, the POC value is incremented, and when an IDR picture is generated, the video data processing device 100 returns the POC value to its initial value. Therefore, a timing at which an IDR picture is to be inserted may be specified accurately.

Embodiment 2

Figure 4:
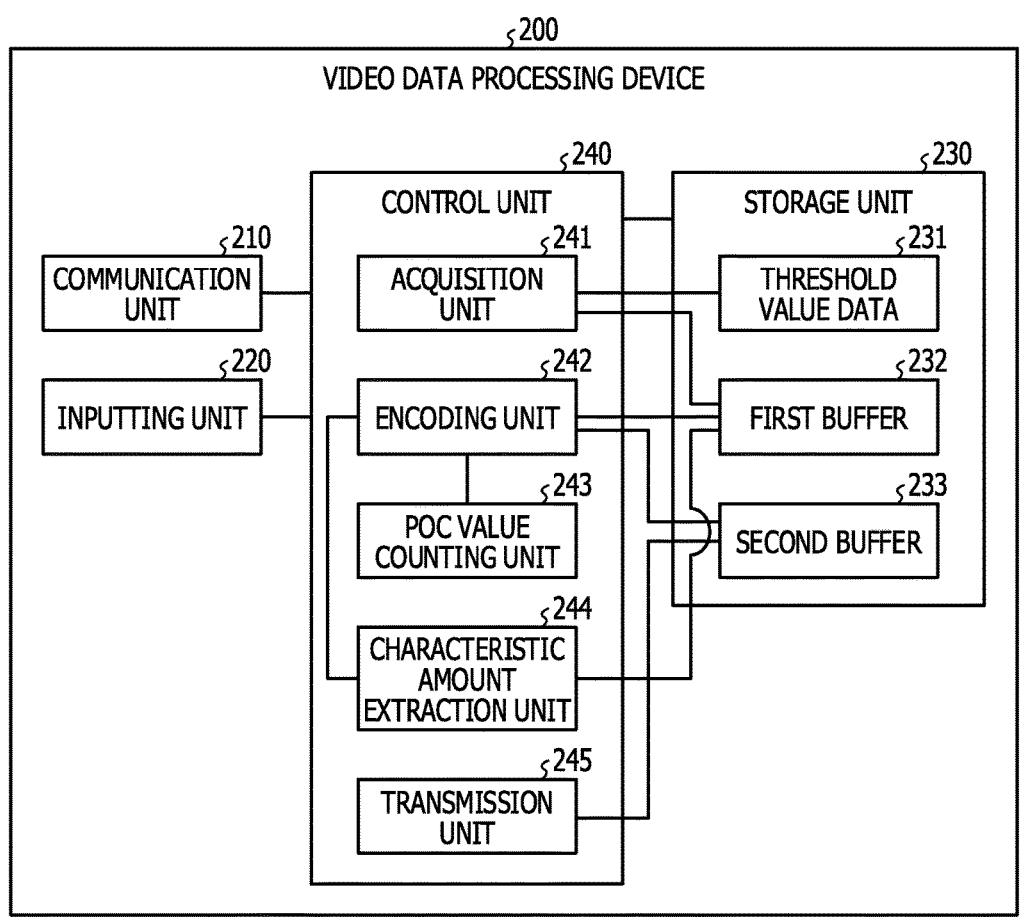
FIG. 4 is a functional block diagram depicting a configuration of a video data processing device according to an embodiment 2.

An example of a video data processing device according to an embodiment 2 is described. FIG. 4 is a functional block diagram depicting a configuration of a video data processing device according to an embodiment 2. As depicted in FIG.

4, the video data processing device 200 includes a communication unit 210, an inputting unit 220, a storage unit 230 and a control unit 240.

Referring to FIG. 4, the communication unit 210, inputting unit 220 and storage unit 230 are similar to the communication unit 110, inputting unit 120 and storage unit 130 described hereinabove with reference to FIG. 1, respectively. Further, the storage unit 230 includes a threshold value data 231, a first buffer 232 and a second buffer 233, which are similar to the threshold value data 131, first buffer 132 and second buffer 133 described hereinabove with reference to FIG. 1, respectively. It is to be noted that the threshold value data 231 includes a fifth threshold value in place of the third threshold value.

The control unit 240 includes an acquisition unit 241, an encoding unit 242, a POC value counting unit 243, a characteristic amount extraction unit 244 and a transmission unit 245. The acquisition unit 241, POC value counting unit 243 and transmission unit 245 are similar to the acquisition unit 141, POC value counting unit 143 and transmission unit 145 described hereinabove with reference to FIG. 1.

A process performed by the encoding unit 242 to decide a timing at which an IDR picture is to be inserted is different from that by the encoding unit 142 depicted in FIG. 1. However, other processes by the encoding unit 242 are similar to those by the encoding unit 142. A timing at which an IDR picture is to be inserted by the encoding unit 242 is hereinafter described.

The characteristic amount extraction unit 244 is a processor that extracts a characteristic amount on the basis of original image data stored in the first buffer 232 and notifies the encoding unit 242 of information of the extracted characteristic amount.

The characteristic amount extraction unit 244 calculates a flatness of original image data as a characteristic amount. The flatness is a value indicative of in what manner pixel values of pixels of original image data spread. The characteristic amount extraction unit 244 calculates the flatness, for example, in accordance with an expression (4) given below. In the expression (4), an average pixel value is an average value of pixel values of pixels of original image data, and $a(i,j)$ is a pixel value at coordinates $(i,j)$ of the original image data.

$$\text{Flatness} = \Sigma(\text{average pixel value} - a(i,j))^2 \quad (4)$$

It is to be noted that the characteristic amount extraction unit 244 may calculate a flatness on the basis of a ratio of a coefficient of a direct current (DC) component when discrete cosine transform is performed for original image data.

Now, a process performed by the encoding unit 242 described above to decide a timing at which an IDR picture is to be inserted is described. For example, when the POC value is higher than a first threshold value, the encoding unit 242 advances its processing to a process for deciding a timing at which an IDR picture is to be inserted.

After the process for deciding a timing at which an IDR picture is to be inserted is entered, if the POC value is higher than a second threshold value, then the encoding unit 242 decides that the time at present is a timing at which an IDR picture is to be inserted. The second threshold value is a threshold value higher than the first threshold value and corresponds, for example, to a maximum value that may be taken by the POC value. The first threshold value and the second threshold value may be suitably set by a manager.

If the POC value is equal to or lower than the second threshold value, then the encoding unit 242 decides on the basis of the flatness whether or not the original image data have a flatness equal to or higher than a certain reference. For example, if the flatness is lower than a fifth threshold value, then the encoding unit 242 decides that the original image data have a flatness equal to or higher than the certain reference.

If the encoding unit 242 decides that the original image data have a flatness equal to or higher than the certain reference, then the encoding unit 242 further specifies an encoding buffer occupancy. For example, the encoding buffer is a buffer for storing original image data when encoding is to be performed. The encoding buffer occupancy is a value determined on the basis of an information amount of original image data of an encoding target occupying in the encoding buffer. If the encoding buffer occupancy is equal to or higher than a threshold value 4, then the encoding unit 242 decides that the time at present is a timing at which an IDR picture is to be inserted. Thus, the encoding unit 242 generates an IDR picture on the basis of the original image data and inserts the IDR picture into encoded stream information.

Here, if the original image data have a flatness equal to or higher than the reference value, then since it is considered that a simple image is included in the original image data, the information amount is not very great. Therefore, even if an IDR picture whose information amount is limited is inserted, screen image deterioration may be suppressed.

Figure 5:
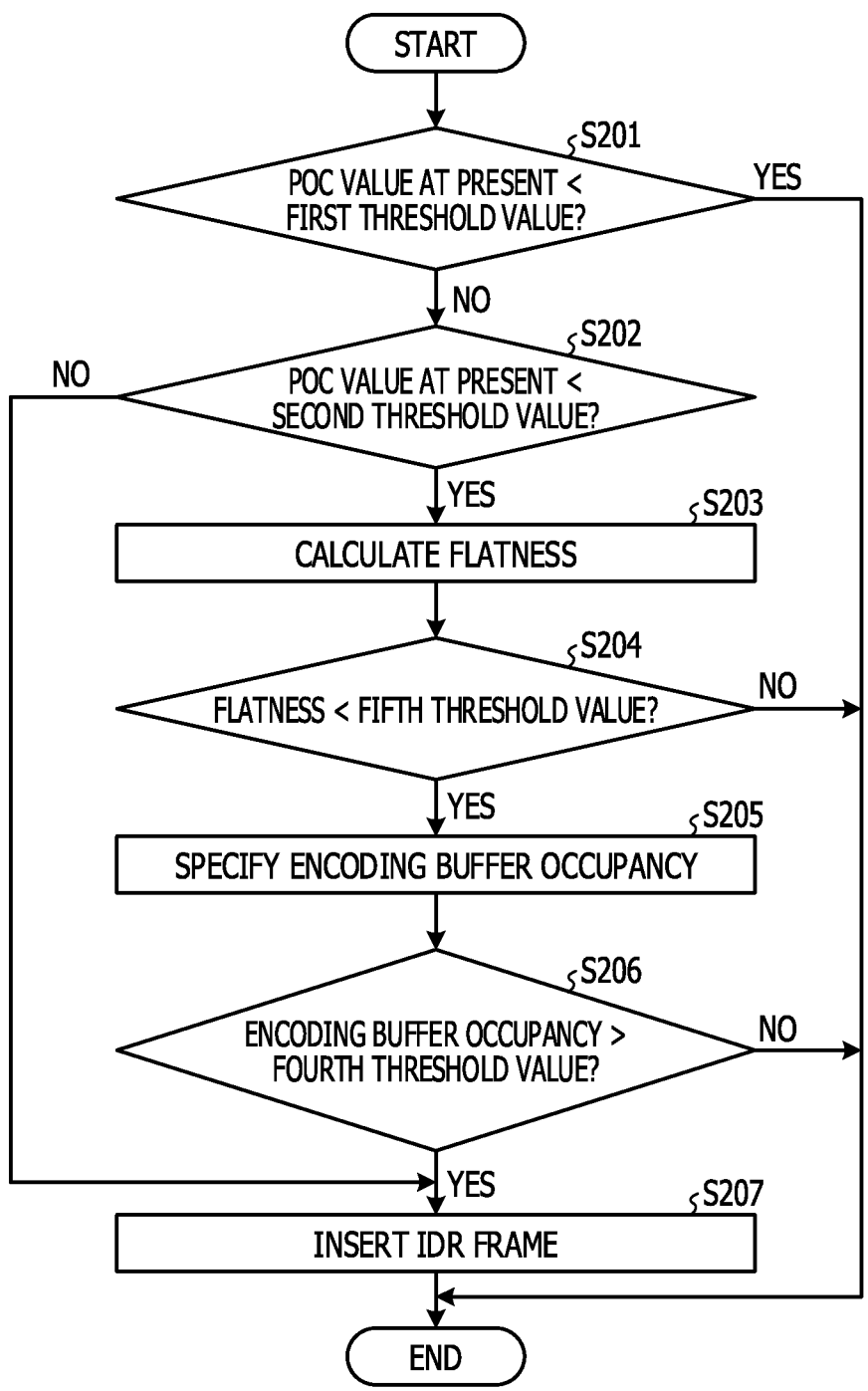
FIG. 5 is a flow chart illustrating a processing procedure of the video data processing device according to the embodiment 2.

Now, a processing procedure of the video data processing device 200 according to the embodiment 2 is described. FIG. 5 is a flow chart illustrating a processing procedure of the video data processing device according to the embodiment 2. For example, every time original image data is encoded, the video data processing device 200 executes the process illustrated in FIG. 5.

As depicted in FIG. 5, the encoding unit 242 of the video data processing device 200 decides whether or not the POC value at present is lower than the first threshold value (step S201). If the encoding unit 242 decides that the POC value at present is lower than the first threshold value (step S201: Yes), then the encoding unit 242 ends the processing.

On the other hand, if the encoding unit 242 decides that the POC value at present is equal to or higher than the first threshold value (step S201: No), then the encoding unit 242 decides whether or not the POC value at present is lower than the second threshold value (step S202). If the encoding unit 242 decides that the POC value at present is equal to or higher than the second threshold value (step S202: No), then the encoding unit 242 advances the processing to step S207.

On the other hand, if the encoding unit 242 decides that the POC value at present is lower than the second threshold value (step S202: Yes), then the characteristic amount extraction unit 244 of the video data processing device 200 calculates a flatness (step S203). Then, the encoding unit 242 decides whether or not the flatness is lower than the fifth threshold value (step S204).

If the encoding unit 242 decides that the flatness is equal to or higher than the fifth threshold value (step S204: No), then the encoding unit 242 ends the processing. On the other hand, if the encoding unit 242 decides that the flatness is lower than the fifth threshold value (step S204: Yes), then the encoding unit 242 specifies an encoding buffer occupancy (step S205). Then, the encoding unit 242 decides whether or not the encoding buffer occupancy is equal to or higher than the fourth threshold value (step S206).

If the encoding unit 242 decides that the encoding buffer occupancy is not equal to or higher than the fourth threshold value (step S206: No), then the encoding unit 242 ends the processing. On the other hand, if the encoding unit 242 decides that the encoding buffer occupancy is equal to or higher than the fourth threshold value (step S206: Yes), then the encoding unit 242 inserts an IDR frame (step S207).

Now, an effect of the video data processing device 200 according to the embodiment 2 is described. If the POC value reaches the first threshold value, then the video data processing device 200 decides whether or not the original image data of an encoding target are flat. Then, at a timing at which it is detected that the pieces of original image data of an encoding target are flat, the video data processing device 200 generates and inserts an IDR picture into encoded stream information. Consequently, image deterioration when an IDR picture is inserted may be suppressed. For example, if the original image data have a flatness equal to or higher than the certain reference value, then it is considered that a simple image is included in the original image data, and therefore, the information amount is not very great. Consequently, even if an IDR picture whose information amount is limited is inserted, image deterioration may be suppressed.

Figure 6:
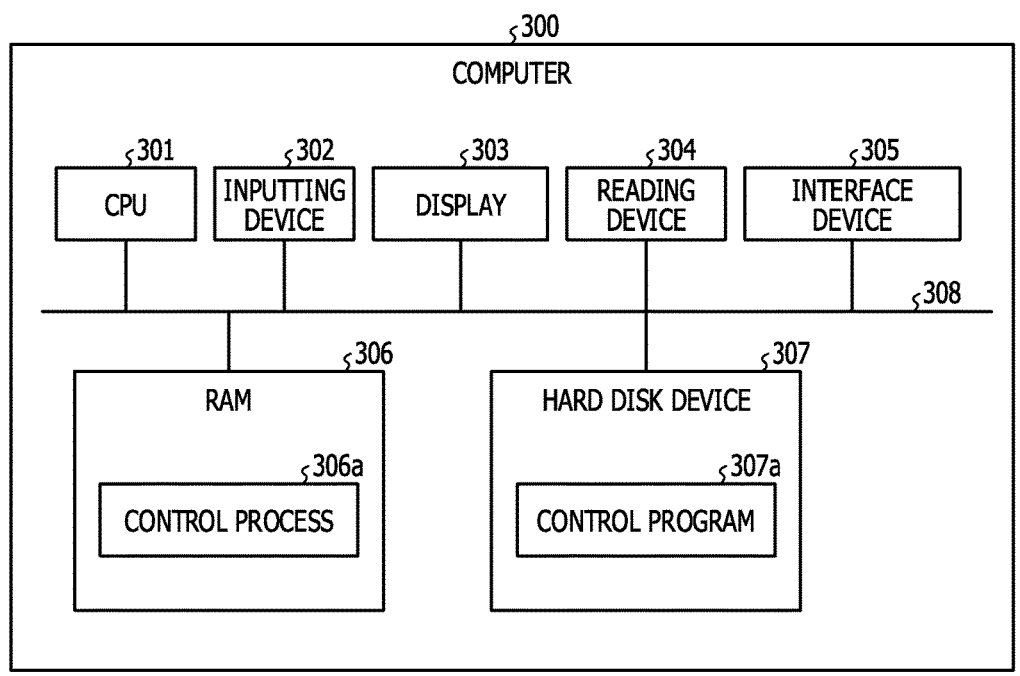
FIG. 6 is a view depicting an example of a computer that executes a video data processing program.
Figure 7:
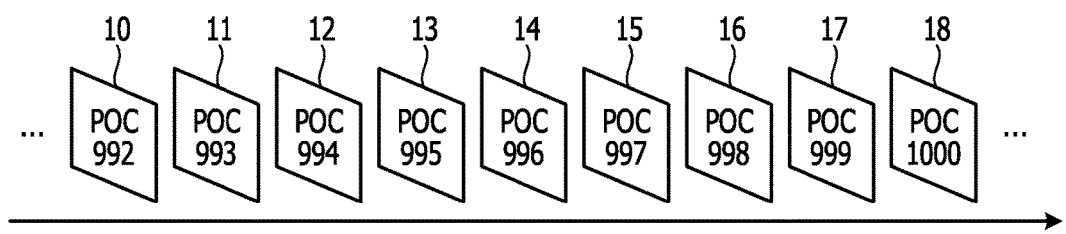
FIG. 7 is a view illustrating a timing at which an IDR picture is inserted according to a prior art.

Now, an example of a computer that executes a video data processing program for implementing functions similar to those of the video data processing devices 100 and 200 described hereinabove in connection with the embodiments 1 and 2 is described. FIG. 6 is a view depicting an example of a computer that executes a video data processing program.

As depicted in FIG. 6, the computer 300 includes a CPU 301 that executes various arithmetic operation processes, an inputting device 302 that accepts an input of data from a user, and a display unit 303. The computer 300 further includes a reading device 304 that reads programs and so forth from a storage medium, and an interface device 305 that performs transfer of data to and from a different computer through a network. The computer 300 further includes a RAM 306 that temporarily stores various kinds of information, and a hard disk device 307. The components 301 to 307 are coupled to a bus 308.

The hard disk device 307 includes a control program 307a. The CPU 301 reads out the control program 307a and develops the control program 307a on the RAM 306. The control program 307a functions as a control process 306a. For example, the control process 306a corresponds to the control unit 140.

It is to be noted that the control program 307a may not necessarily be stored in the hard disk device 307 from the beginning. For example, various programs are stored in advance into a "portable physical medium," which is inserted into the computer 300, such as a flexible disk (FD), a compact disk ROM (CD-ROM), a digital versatile disk (DVD), a magneto-optical disk or an integrated circuit (IC) card. Then, the computer 300 may read out and execute the control program 307a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A video data processing device, comprising:
a processor; and
a memory which stores a plurality of instructions, which when executed by the processor, cause the processor to execute:
    generating, on the basis of first key frames obtained by encoding images in frames included in moving image data, difference frames in each of which a partial image different from an image in a frame corresponding to each first key frame is encoded;
    determining, when a number of generated difference frames is larger than or equal to a first number and smaller than or equal to a second number, whether a difference between a difference frame generated thereafter and a difference frame preceding in time to the difference frame generated thereafter is smaller than or equal to a given value; and
    when the difference is smaller than or equal to the given value, generating a second key frame distinguished from the first key frames and inserting the second key frame into an encoded data stream at a timing at which it is determined that the difference is smaller than or equal to the given value.

2. The device according to claim 1,
wherein the second key frame is a frame indicative of a delimiter for a frame set for which encoding of the moving image data is to be performed.

3. The device according to claim 1,
wherein the processor is configured to generate a next frame as the second key frame when the number of generated difference frames is greater than the second number.

4. The device according to claim 1,
wherein the processor is configured to successively apply a sequence number to each of the difference frames, return the sequence number to an initial value when the second key frame is generated, and successively apply a sequence number beginning with the initial value to each of difference frames following the second key frame.

5. The device according to claim 1,
wherein the processor is configured to, when detecting that the number of the generated difference frames is larger than or equal to the first number and smaller than or equal to the second number and the images in the frames corresponding to the difference frames are flat, generate the second key frame distinguished from the first key frame.

6. A video data processing method, comprising:
generating, by a computer processor, on the basis of first key frames obtained by encoding images in frames included in moving image data, difference frames in each of which a partial image different from an image in a frame corresponding to each first key frame is encoded;
determining, when a number of generated difference frames is larger than or equal to a first number and smaller than or equal to a second number, whether a difference between a difference frame generated thereafter and a difference frame preceding in time to the difference frame generated thereafter is smaller than or equal to a given value; and
when the difference is smaller than or equal to the given value, generating a second key frame distinguished from the first key frames and inserting the second key frame into an encoded data stream at a timing at which it is determined that the difference is smaller than or equal to the given value.

7. The method according to claim 6, wherein the second key frame is a frame indicative of a delimiter for a frame set for which encoding of the moving image data is to be performed.

8. The method according to claim 6, further comprising: generating a next frame as the second key frame when the number of generated difference frames is greater than the second number.

9. The method according to claim 6, further comprising: successively applying a sequence number to each of the difference frames, returning the sequence number to an initial value when the second key frame is generated, and successively applying a sequence number beginning with the initial value to each of difference frames following the second key frame.

10. The method according to claim 6, further comprising: when detecting that the number of the generated difference frames is larger than or equal to the first number and smaller than or equal to the second number and the images in the frames corresponding to the difference frames are flat, generating the second key frame distinguished from the first key frame.

* * * * *